United States Patent [19]

Peppers et al.

[11] Patent Number: 4,903,315
[45] Date of Patent: Feb. 20, 1990

[54] APPARATUS FOR ENLARGING OR REDUCING AN IMAGE PATTERN

[75] Inventors: Norman A. Peppers, Belmont; James R. Young, Palo Alto; Gerald A. Pierce, Redwood City, all of Calif.

[73] Assignee: Nippon Sheet Glass Co., Ltd., Osaka, Japan

[21] Appl. No.: 355,889

[22] Filed: May 19, 1989

Related U.S. Application Data

[63] Continuation of Ser. No. 48,046, May 11, 1987, abandoned.

[51] Int. Cl.$^4$ .............................................. G06K 9/42
[52] U.S. Cl. ...................................... 382/47; 358/451; 382/63
[58] Field of Search .......................... 382/47, 62, 63; 340/731; 358/451

[56] References Cited

U.S. PATENT DOCUMENTS

| | | | |
|---|---|---|---|
| 3,179,922 | 4/1965 | Rabinow | 382/47 |
| 3,189,873 | 6/1965 | Rabinow | 382/47 |
| 3,432,673 | 3/1969 | Mader | 382/63 |
| 3,462,737 | 8/1969 | Malaby | 382/47 |
| 4,672,681 | 6/1987 | Goldkuhle | 382/47 |
| 4,750,048 | 6/1988 | Satoh et al. | 358/451 |

*Primary Examiner*—Leo H. Boudreau
*Assistant Examiner*—Daniel Santos
*Attorney, Agent, or Firm*—Woodcock Washburn Kurtz Mackiewicz & Norris

[57] ABSTRACT

Disclosed is an apparatus for enlarging or reducing an image pattern, wherein the image pattern and a pair of parallel image sensors are moved relative to each other to read the image pattern, the size of the image pattern along the moving direction is calculated on the basis of an output from one image sensor, a read clock frequency of the other image sensor is controlled on the calculated size of the image pattern, and thus enlargement or reduction of the image pattern along the moving direction can be easily performed.

8 Claims, 1 Drawing Sheet

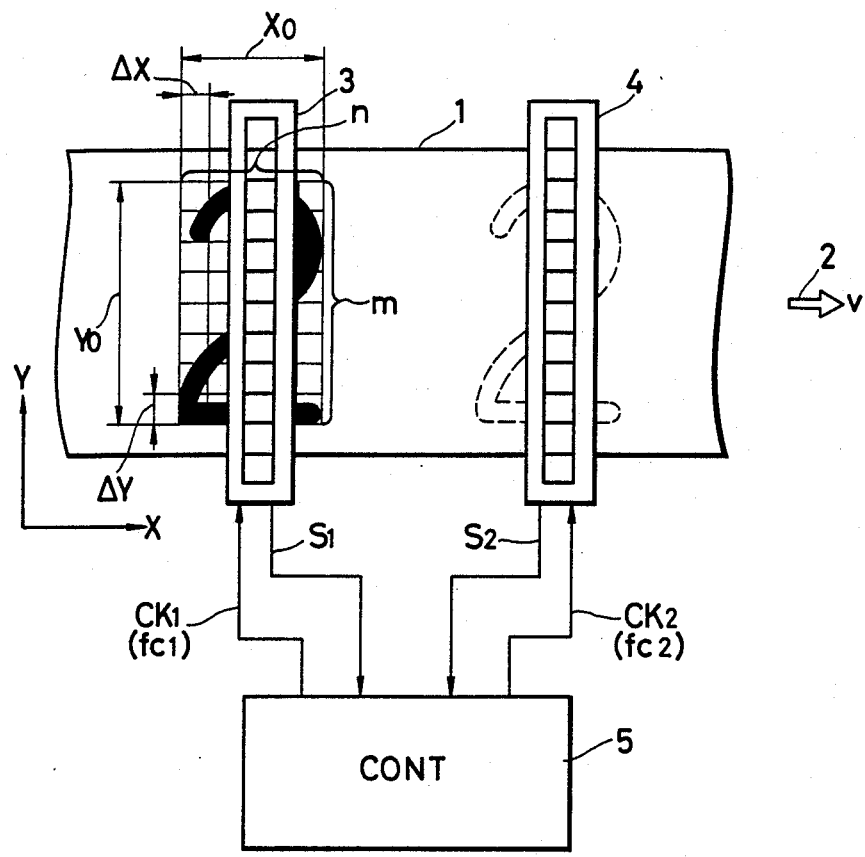

APPARATUS FOR ENLARGING OR REDUCING AN IMAGE PATTERN

This is a continuation of application Ser. No. 048,046, filed May 11, 1987.

BACKGROUND OF THE INVENTION

I. Field of the Invention

The present invention relates to an apparatus for enlarging or reducing the size of an image pattern such as a character or graphic pattern and, more particularly, to an apparatus suitable for normalizing an image pattern into a pattern of a predetermined size when data representing a feature of the image pattern to be recognized is compared with a set of reference data in an image recognition apparatus.

II. Description of the Prior Art

A conventional image recognition apparatus for recognizing an image such as a character or any other graphic pattern is designed to digitally process the image by using an electronic technique. An image to be recognized is processed by, e.g., vector analysis to obtain data representing a feature of the image. The feature data is compared with a set of reference data stored in a data base to determine by correlation calculations which reference data matches with the feature data more than the others, so that the image is specified with the most matching reference data.

In this case, however, the size of the image to be recognized is indefinite. For instance, when images are characters, they vary in size whether they are printed or handwritten characters. In a character recognition process, a character to be recognized is read with an image sensor and converted into digital data, which is then stored in a memory. Feature data of the character is prepared on the basis of the digital data stored in the memory to be compared with a set of reference data, each of which is feature data prepared for each character normalized in a predetermined size.

In this conventional process, the feature data obtained from the character to be recognized is prepared in accordance with the size of the character while the set of the reference data to be compared with the above feature data have been derived from characters having a normalized size. Therefore, when the size of the character to be recognized is different from the normalized size, the correlation calculation often results in nonmatching even when the character to be recognized is the same as that represented by one of the set of the reference data.

In order to solve this problem, the character to be recognized must be enlarged or reduced so as to be normalized to the same size as that of the characters represented by the set of the reference data, and feature data must be derived on the basis of the normalized character to be recognized.

In a conventional method for enlarging or reducing written characters, the plane including a written character is scanned in proper directions, for instance, in the horizontal, vertical, 45° and 135° directions. The initial and last intersecting points of each scanning line with the character are detected, and thereby peripheral points of the character are found. The whole size and the center position of the character are then determined according to the peripheral points of the character. Subsequently, some of $n \times m$ pixels of the character stored in a memory are repeated or removed as needed on the basis of the center position of the character to normalize the character to a size constituted by $n_0 33 \, m_0$ pixels.

As described above, according to the conventional method, many processing steps and long calculation time are required to enlarge or reduce one character constituted by a matrix of $n \times m$ pixels into a size of $n_0 \times m_0$ pixels. As a result, the throughout of the computer for processing is degraded.

SUMMARY OF THE INVENTION

It is an object of the present invention to provide an apparatus for enlarging or reducing an image pattern wherein the image pattern can be enlarged or reduced in the reading process so as not to require so long calculation time like a conventional apparatus, and the amount of data processed can be reduced to remarkably improve the throughput of the computer for processing.

It is another object of the present invention to provide an apparatus optimum for normalizing a character to be recognized into a size suitable for being compared with a reference pattern.

It is still another object of the present invention to provide an apparatus for enlarging or reducing an image pattern, wherein an image pattern written on a paper or displayed on a cathode-ray tube or the like can be enlarged or reduced.

The above and other objects are attained by the invention as follows.

According to the invention, an apparatus for enlarging or reducing an image pattern, comprises: first and second image sensors for reading the image pattern along a predetermined scanning direction; means for relatively moving the image pattern in relation to the first and second image sensors in a direction different from the scanning direction; means for calculating the size of the image pattern along the moving direction of the image pattern on the basis of an output from the first image sensor; and means for controlling the scanning frequency of the second image sensor on the basis of the calculated size of the image pattern, the second image sensor generating an output signal having a content representing that the image pattern is enlarged or reduced along the moving direction of image pattern.

The above and other objects and features of the invention will appear more fully hereinafter from a consideration of the following description taken in connection with accompanying drawing wherein one example is illustrated by way of example.

BRIEF DESCRIPTION OF THE DRAWING

The drawing shows a plan view and a circuit block showing an embodiment of the present invention.

DETAILED DESCRIPTION OF THE PREFERRED EMBODIMENT

In an embodiment illustrated in the drawing, a figure "2" written on a paper 1 is exemplified as an image pattern subjected to enlargement or reduction.

The paper 1 on which the figure "2" having the height $Y_0$ and the width $X_0$ is moved at a speed v along the X-axis as indicated by an arrow 2. One-dimensional image sensors 3 and 4 in each of which CCDs, MOS sensors or the like are arranged in a row are spaced apart from each other by a predetermined distance over the paper 1 and are to be scanned along the Y-axis so as to read the figure "2" on the paper 1.

The image sensors 3 and 4 are scanned along the Y-axis in response to clocks $CK_1$ and $CK_2$ of the frequencies $f_{c1}$ and $f_{c2}$ generated by a controller 5 including a microcomputer. The frequency $f_{c1}$ is given as $f_{c1} = 1/\tau$ where $\tau$ is a time required for scanning all elements of the first image sensor 3.

The image sensor 3 is scanned in response to the clock $CK_1$ to obtain an output signal $S_1$ therefrom. The controller 5 calculates the width $X_0$ and the height $Y_0$ of the figure "2" on the basis of the signal $S_1$ so that the figure "2" is divided into $n \times m$ pixels according to the width $X_0$ and the height $Y_0$ obtained. When the size of a pixel determined by the element pitch of each of the image sensors 3 and 4 is defined as $\Delta X \times \Delta Y$, the values m and n are defined as follows:

$$m = Y_0/\Delta Y, \quad n = (X_0/v) \times f_{c1}$$

In this instance, the figure "2" constituted by the $n \times m$ pixels is normalized to one having a size of $n_0 \times m_0$ pixels.

When the normalization from m to $m_0$ along the Y-axis is performed, the figure "2" is read at a sufficiently high scanner resolution. Therefore, read signals can be merely assigned to $m_0/m$ times of pixels. The normalization from n to $n_0$ is performed by changing the frequency $f_{c2}$ of the clock $CK_2$ *of the second image sensor 4 according to the magnitude of the value $X_0$* derived from the output signal $S_1$ of the image sensor 3 as follows:

$$f_{c2} = n_0/(X_0/v)$$

When the figure "2" is read again by the second image sensor 4 upon movement of the paper 1, as indicated by the broken line in the drawing, after the figure "2" is read by the image sensor 3, the frequency $f_{c2}$ is changed according to the magnitude of the value $X_0$, thereby obtaining an output signal $S_2$ representing a normalized pattern obtained by enlarging or reducing the figure "2" along the X-axis. In this case, the frequency $f_{c2}$ is changed for the value $X_0$ of each of characters to be normalized.

According to this embodiment, a character such as a figure "2" consisting of $n \times m$ pixels can be normalized to a character consisting of $n_0 \times m_0$ pixels. In this case, although m-to-$m_0$ conversion along the Y-axis is performed by the conventional method, n-to-$n_0$ conversion along the X-axis can be performed merely by changing the clock frequency $f_{c2}$ of the image sensor 4. Therefore, the amount of data processed in a computer can be greatly reduced.

The above description has been made for normalizing a character. However, the present invention can be used for enlarging or reducing an image pattern such as a character or graphic pattern. Further, in the above embodiment, a character written on a paper 1 is read with a pair of image sensors. However, upon moving a separate character image extracted by a line and character separation preprocessing on a display such as a cathode-ray tube, the image on the display may be read with the image sensors. Of course, instead of moving the image, the pair of image sensors may be moved.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus for enlarging or reducing an image pattern, comprising:
   substantially identical first and second image sensors for reading said image pattern with respective scanning frequencies along a predetermined scanning direction, said first and second image sensors each having sensors arranged in a row along said scanning direction;
   means for relatively moving said image pattern in relation to said first and second image sensors in a direction different from said scanning direction;
   means for calculating the size of said image pattern along the moving direction of said image pattern on the basis of the scanning frequency and an output of and from said first image sensor and the speed of moving said image pattern in relation to said first and second image sensors; and
   means for controlling the scanning frequency of said second image sensor on the basis of the calculated size of said image pattern,
   said second image sensor generating an output signal having a content representing that said image pattern is enlarged or reduced along said moving direction of said image pattern.

2. An apparatus according to claim 1, wherein each of said substantially identical first and second image sensors comprises photosensors arranged in a row along said scanning direction, said photosensors being scanned so as to read said image pattern.

3. An apparatus according to claim 1, wherein said image pattern is moved at a predetermined speed along the X-axis and said scanning direction of said substantially identical first and second image sensors is along the Y-axis.

4. An apparatus according to claim 1, wherein said image pattern is one displayed on a screen of a display unit.

5. An apparatus according to claim 1, wherein the image pattern to be read is one displayed on a screen of a display unit.

6. An apparatus for enlarging or reducing an image pattern, comprising:
   means for moving the image pattern at a predetermined speed along the X-axis;
   first and second image sensors for reading the image pattern with respective scanning frequencies, said first and second image sensors having substantially the same construction as each other in which photosensors are arranged in a row along the Y-axis;
   means for calculating the size of the image pattern along the X axis on the basis of the scanning frequency and output signal of and from said first image sensor and the speed of moving said image pattern in relation to said first and second image sensors;
   means for controlling scanning frequency of said second image sensor on the basis of the calculated size of the image pattern such that said second image sensor generates an output signal in which the image pattern is enlarged or reduced along the X-axis.

7. An apparatus for enlarging or reducing an image pattern, comprising:
   substantially identical first and second image sensors for reading said image pattern with respective scanning frequencies $f_{c1}$ and $f_{c2}$ along a predetermined scanning direction, said first and second image sensors each having sensors arranged in a row along said scanning direction;

means for relatively moving said image pattern at a speed v in relation to said first and second image sensors in a direction different from said scanning direction;

means for calculating the size $X_0$ of said image pattern along the moving direction of said image pattern on the basis of an output from said first image sensor and for dividing said image pattern into n pixels along the moving direction so that $$n = \left(\frac{X_0}{V}\right) \times F_{C1};$$

and means for controlling the scanning frequency $f_{c2}$ of said second image sensor to increase or decrease a number of said pixels along the moving direction from n to $n_0$ pixels so that $$f_{C2} = \frac{n_0}{\left(\frac{X_0}{V}\right)},$$

said second image sensor generating an output signal having a content representing that said image pattern is enlarged or reduced along said moving direction of said image pattern.

8. A apparatus for enlarging or reducing an image pattern, comprising:

means for moving the image pattern at a predetermined speed V along the X-axis;

first and second image sensors for reading the image pattern with respective scanning frequencies $f_{c1}$ and $f_{c2}$, said first and second image sensors having substantially the same construction as each other in which photosensors are arranged in a row along the Y-axis;

means for calculating the size of $X_0$ of the image pattern along the X-axis on the basis of an output signal from said first image sensor and for dividing said image pattern into n pixels along the X-axis so that $$n = \left(\frac{X_0}{V}\right) \times f_{C1},$$

and means for controlling scanning frequency $f_{c2}$ of said second image sensor to increase or decrease a number of said pixels along the X-axis from n to $n_0$ pixels so that $$f_{C2} = \frac{n_0}{\left(\frac{X_0}{V}\right)},$$

such that said second image sensor generates an output signal in which the image pattern is enlarged or reduced along the X-axis.

* * * * *